United States Patent [19]
Orton

[11] Patent Number: 5,043,640
[45] Date of Patent: Aug. 27, 1991

[54] RC SPEED CONTROLLER

[76] Inventor: Kevin R. Orton, Tekin Electronics, 970 Calle Negocio, San Clemente, Calif. 92672

[21] Appl. No.: 589,773

[22] Filed: Sep. 28, 1990

Related U.S. Application Data

[63] Continuation-in-part of Ser. No. 491,197, Mar. 9, 1990, abandoned.

[51] Int. Cl.[5] .............................................. H04Q 7/02
[52] U.S. Cl. .................................... 318/16; 388/833; 446/456
[58] Field of Search ............... 446/431, 441, 448, 454, 446/456; 318/16; 388/825–827, 830–833; 361/23, 30–31, 90

[56] References Cited

U.S. PATENT DOCUMENTS

| | | | |
|---|---|---|---|
| 3,569,969 | 3/1971 | Lemon | 343/225 |
| 4,143,307 | 3/1979 | Hanson et al. | 318/16 |
| 4,153,853 | 5/1979 | De Villeneuve | 318/16 X |
| 4,160,253 | 7/1979 | Mabuchi et al. | 318/16 X |
| 4,171,592 | 10/1979 | Saitoh | 446/456 |
| 4,488,094 | 12/1984 | Min et al. | 318/16 |
| 4,584,504 | 4/1986 | Lee et al. | 318/16 |
| 4,687,975 | 8/1987 | Suzuki | 318/16 X |
| 4,739,232 | 4/1988 | Ishimoto | 318/16 X |
| 4,764,150 | 8/1988 | Uchino | 446/456 |
| 4,964,837 | 10/1990 | Collier | 446/456 X |

OTHER PUBLICATIONS

Instruction manual of Tekin Electronics, Inc. for a Model 600 speed control, 1989.
Schematic circuit diagram of Tekin Electrons, Inc. for a Model 600 speed control, 10/23/89.

Primary Examiner—William M. Shoop, Jr.
Assistant Examiner—David Martin
Attorney, Agent, or Firm—Loyal M. Hanson

[57] ABSTRACT

A speed controller includes a housing adapted to be mounted in a radio controlled model car having a DC motor, a battery, and a receiver, and a control circuit for controlling the amount of votage supplied to the DC motor according to speed information supplied by the receiver. The control circuit is mounted in the housing and it is adapted to be electrically connected to the DC motor, the battery, and the receiver. It includes circuitry for producing an output signal related to the amount of current supplied to the motor and a test point arrangement for facilitating the connection of a separate readout device to the control circuit for purposes of reading the output signal.

16 Claims, 1 Drawing Sheet

RC SPEED CONTROLLER

CROSS REFERENCE TO RELATED APPLICATION

This application is a continuation-in-part of copending U.S. patent application Ser. No. 491,197 filed Mar. 9, 1990, now abandoned.

BACKGROUND OF THE INVENTION

1. Technical Field This invention relates generally to radio controlled models, and more particularly to an electronic speed controller for an RC model car.

2. Background Information

A typical RC model car race may have ten or more operators simultaneously racing 1/10 scale RC model cars around a carefully groomed 450 foot track at lap speeds in the 16-second range. But even with a model car fully outfitted and finely tuned, the winner may only edge out the runnerups by a few seconds or less. That, of course, encourages attention to details of RC model car construction and operation in preparation for the next race, and so such competitive activity makes each of those details important.

One detail concerns overall efficiency, especially efficient use of battery power, and RC racing enthusiasts go to great lengths to achieve a one or two percent improvement by such things as fine tuning gear ratios, testing and selecting battery cells, changing armature windings, and so forth. To better visualize the problem, consider a typical RC model car having a DC motor for driving the wheels and a nicad battery for supplying power to the motor. The operator varies the amount of voltage supplied to the motor, and thereby the speed of the model car, by remote control using a handheld transmitter. For that purpose, the transmitter often includes a pistol grip with a spring loaded trigger that the operator squeezes to increase speed and releases to decrease speed. But that arrangement can be a problem in high speed competition because it is so easy under stress to squeeze the trigger too much. Then excess trigger travel results in excess voltage and current and therefore excess motor torque that can overcome traction, spin the wheels, and waste battery power beyond good RC racing practice which dictates using maximum power to the extent possible without running out of power before the end of the race.

To overcome that problem, some RC model cars include an adjustable current limiter because motor torque is related to current. It is usually part of a miniature, lightweight, onboard, RC speed controller that operates conventionally in many respects to control the motor according to signals received by an onboard receiver from the handheld transmitter. The operator adjusts the current limiter to a selected level or setpoint by manipulating a miniature potentiometer and that limits the current to that setpoint regardless of how far the trigger travels. In order to determine the desired setpoint, however, the operator guesses the proper setting. Then, after operating the model car at that setting, the operator readjusts the potentiometer and operates the model car again, repeating the process until overly wasteful wheel spinning and current drainage do not occur.

But such an empirical determination may be somewhat inconvenient and time consuming. In addition, it can result in a setpoint that is not conveniently repeated, the operator basically having to guess the desired setting of a miniature potentiometer each time the setpoint is changed. Furthermore, the operator may prefer to determine the desired setpoint just before a race in order to account for constantly varying track conditions and projected racing time, but doing so may mean using precious battery power. Moreover, there may be insufficient time before the race for enough trial runs. So some better way of adjusting the setpoint is needed.

SUMMARY OF THE INVENTION

This invention solves the problem outlined above by providing an RC speed controller that has a current limiter and a test point arrangement that facilitates connection of a meter or other suitable readout device (e.g., a digital voltmeter). The current limiter is configured to produce an output signal representative of the current supplied to the motor so that the operator can use a separate, detachable readout device to monitor setpoint adjustments. First, the operator determines a reference setpoint for a particular RC model car using existing empirical methods while noting a corresponding reference value indicated by the readout device. Thereafter, the operator simple consults the readout device in order to adjust the speed controller back to the reference setpoint or to some other setpoint that is some desired proportion of the reference setpoint. The readout device simply provides a readily discernible relative indication of setpoint adjustments.

Thus, adjustment of the speed controller is more convenient. It is less time consuming. A particular setpoint can be conveniently repeated. Adjustment uses very little battery power. It can be done rapidly just before the race. The operator can vary the setpoint by a selected proportion of the reference setpoint in order to account for experience gained from a previous race, and the use of a separate, external readout device that can be detached adds no additional weight or size to the miniature speed controller.

Generally, a speed controller constructed according to the invention includes a housing adapted to be mounted in a radio controlled model car having a DC motor, a battery, and a receiver, and a control circuit that controls the amount of current supplied by the battery to the DC motor according to speed information supplied by the receiver. The control circuit is mounted in the housing and to be electrically connected to the DC motor, the battery, and the receiver.

Those components may be similar in many respects to corresponding parts of existing speed controllers, with access to the control circuit being limited by the housing. According to a major aspect of the present invention, the control circuit includes means for producing an output signal related to the amount of current supplied to the motor together with means for facilitating coupling of the output signal to a separate readout device. The means for coupling the output signal to a separate readout device is a test point arrangement that facilitates electrically connection to the control circuit, such as an electrically conductive element that extends from the control circuit to an accessible location on the housing exterior where a user can easily connect the readout device. The electrically conductive element may be an electrically conductive pin or other type of terminal that is soldered appropriately to the control circuit so that it extends from the control circuit through an opening in the housing to the exterior of the housing, so that an operator can fasten the end of a meter test lead to it. The other test lead of the meter can often be connected to a common ground wire. As another example, the test point arrangement may just be a small opening in the housing, located in alignment with a pad or other component of the control circuit so that the operator can connect to the pad or other component by inserting a test lead or other probe through the opening. The opening guides the test lead or probe to the appropriate point on the control circuit.

The control circuit preferably includes means for adjustably limiting the amount of current supplied to the motor. For that purpose, one embodiment includes circuitry for limiting the amount of current supplied to the motor once the amount of current reaches a selected level, and it includes circuitry for adjusting the selected level. In that regard, the control circuit may be configured to increase the amount of current supplied to the motor at a first rate when the amount of current is less than the selected level and at a second rate that is less than the first rate when the amount of current is greater than the selected level.

Furthermore, the speed information supplied by the receiver may be related to the position of a separate speed control such as the accelerator trigger on a conventional pistol grip type of handheld transmitter. Then the control circuit varies the amount of power supplied to the motor according to variations in the position of the speed control, preferably increasing the amount of power supplied to the motor at a first rate when the amount of current supplied to the motor is less than the selected level and at a second rate when the amount of current supplied to the motor is greater than the selected level. That enables more accurate speed control once a certain speed is reached because it results in less change in motor speed for a give amount of movement of the speed control.

Moreover, the control circuit may be configured to allow a brief burst of current if the position of the accelerator trigger changes rapidly in a direction increasing the power supplied. The control circuit delays briefly for that purpose. In other words, when the accelerator trigger is pulled rapidly, the control circuit continues to increase the power beyond the selected level at the first rate for a short burst before returning to the level that would have occurred if the control circuit had immediately changed to the second rate. From the foregoing, it is apparent that the control circuit can be configured to increase the current at a third once a second selected level is attained, and so forth.

DESCRIPTION OF THE PREFERRED EMBODIMENTS

Figure 1:
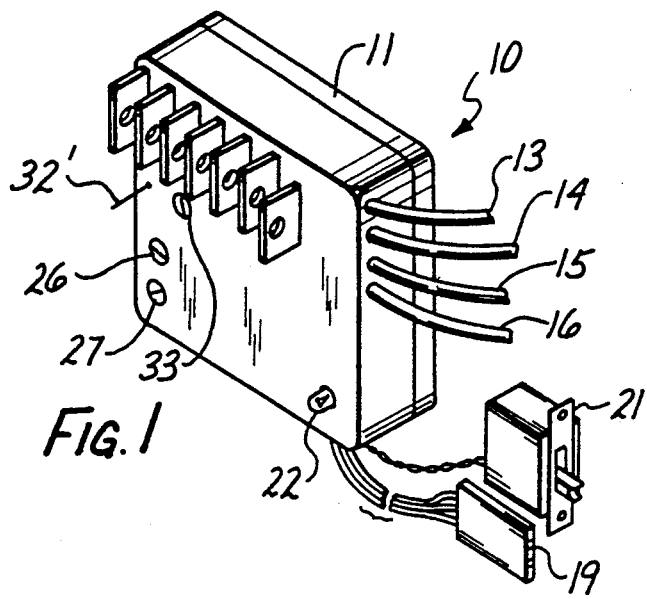
FIG. 1 of the drawings is a perspective view of an RC speed controller constructed according to the invention.
Figure 2:
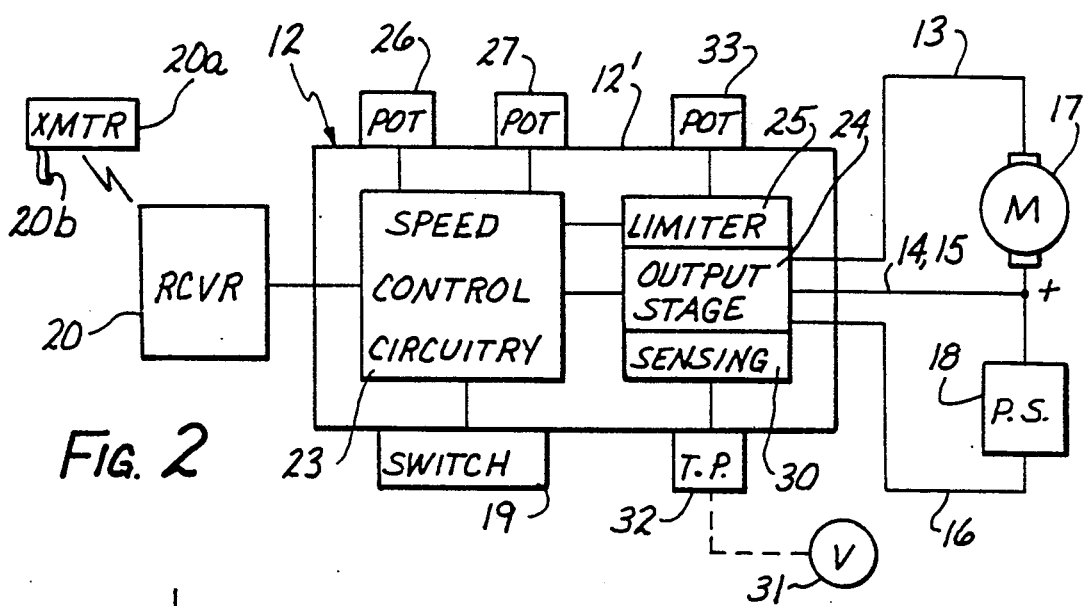
FIG. 2 is a block diagram of the RC speed controller.

The drawings show a miniature speed controller 10 constructed according to the invention. Generally, it includes a housing 11 (FIG. 1) that contains a control circuit 12 (FIG. 2). The housing 11 takes the form of a hollow case composed of a suitable material, such as plastic, that is adapted to be mounted in a radio controlled model car. In other words, it is small and lightweight, measuring about 30 millimeters by 35 millimeters by 15 millimeters and weighing about one or two ounces. Of course, those parameters are not critical to the inventive features described and they may vary somewhat without precluding use in a RC model car.

Similar in some respects to existing miniature speed controllers, such as the Model 600 speed control available from Tekin Electronics, Inc. of San Clemente, Calif., the speed controller 10 includes 13 gauge wires 13-16 (FIGS. 1 and 2) for connecting it to both a known type of DC motor 17 used in radio controlled model cars and a known type of battery 18 used in such model cars (FIG. 2). In that regard, the wires 14 and 15 are illustrated as one line in FIG. 2, and the battery is labeled "P.S." as an abbreviation for power supply. In addition, the speed controller 10 includes a cable arrangement 19 (FIGS. 1 and 2) for connecting it to a known type of RC receiver component or receiver 20 (FIG. 2) used in RC model cars, and a switch arrangement 21 for turning the control circuit 12 on and off. A light 22 is used to adjust the control circuit 12 so that it is compatible with the signal from the receiver 20. Those components are connected to a circuitboard 12' that is suitably mounted within the housing 11 that serves as the support structure for various components of the control circuit 11 subsequently described. Of course, interconnections other than the wires 13-16 and cable arrangement 19 may be provided, but whatever they are they may be referred to as components which adapt the control circuit 12 to be electrically connected to the DC motor 17, the battery 18, and the receiver 20.

The control circuit 12 includes speed control circuitry 23 mounted on the circuitboard 12' (FIG. 2) that operates conventionally in many respects to control the amount of power supplied by the battery 18 to the DC motor 17 according to speed information supplied by the receiver 20. In that regard, the operator uses any of various commercially available handheld transmitters, such as those with pistol grips available from Futaba Corporation of America located in Irvine, Calif. (not shown). A transmitter 20a in FIG. 2 represents such a transmitter. Squeezing a trigger 20b of the transmitter 20a (i.e., the speed control) causes a signal to be transmitted in a known manner to the receiver 20 and that communicates information about trigger position to the receiver 20. The receiver 20 then operates in a known way to supply that information to the speed control circuitry 23, and the speed control circuitry 23 functions conventionally in many respects to control the amount of power supplied from the battery 18 to the DC motor 17, and thus the speed of the DC motor 17, according to trigger position. That is done as subsequently described by controlling output stage circuitry 24 with the speed control circuitry 23 and limiting its output with a limiter circuit 25. A potentiometer 26 conventionally enables operator adjustment of the speed control circuitry 23 to the receiver 20 for zero speed while a potentiometer 27 enables operator adjustment for high speed.

According to the present invention, the control circuitry 12 also includes means for producing an output signal related to the amount of current supplied to the DC motor 17. That is accomplished in the illustrated speed controller 10 with a current sensing circuit 30 (FIG. 2). It may use known componentry configured according to known design techniques to produce the output signal, such as an operational amplifier connected to sense the voltage drop along a trace on the printed circuitboard 12'. In addition, the control circuitry 12 includes means for facilitating coupling of the output signal to a separate readout device 31 (e.g., the voltmeter in FIG. 2). That is accomplished in the speed controller 10 with a test point arrangement 32 (FIGS. 1, 1a, and 2) that facilitates electrical connection to the sensing circuit 30 according to known techniques.

Figure 1A:
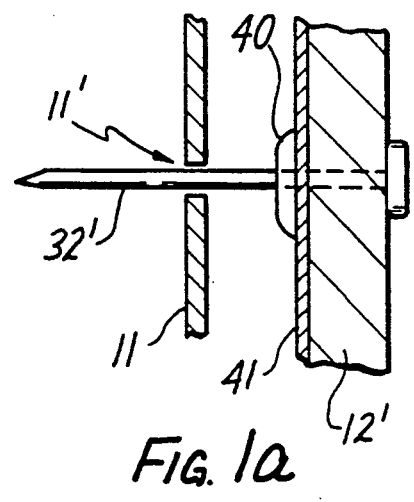
FIG. 1a is an enlarged cross sectional view of the RC speed controller showing test point details.

In other words, the control circuit 12 is mounted within the housing 11 in a way limiting access to the control circuit 12 and therefore the sensing circuit 30, and the test point arrangement 32 serves as means for facilitating coupling the sensing circuit 30 to the separate readout device 31. Preferably, the test point arrangement 32 includes an electrically conductive element that extends from the control circuit 12 to an accessible location on the exterior of the housing 11 in order to facilitate connection of the readout device 31 to the sensing circuit 30. For that purpose, the test point arrangement 32 may include an electrically conductive pin 32' (FIGS. 1 and 1a) that extends from a solder pad 40 securing the pin 32' to a trace 41 on the circuitboard 12' (or other component on the circuitboard 12') through an opening 11' in the housing 11 to an accessible point on the exterior of the housing 11, all as shown in FIG. 1a, so that an operator can conveniently connect and detach the readout device 32 at will.

Thus, the term "test point arrangement" is intended to include any structure facilitating connection to a particular connection point on the control circuit from the exterior of the housing. So, it may just include an opening in the housing that is located in alignment with the particular connection point. It may include an opening in the housing in combination with an electrically conductive element (such as a pin or a wire, or any other conductive element) that extends from the particular connection point on the control circuit to an accessible point in or adjacent the opening. In addition, it may take the form of an arrangement having an electrically conductive element formed with the housing (e.g., during molding) to extend from the interior of the housing to the exterior of the housing, in which case it might be said that there really is no "opening." From the foregoing and following descriptions, it could also include other coupling means within the broader inventive concepts disclosed, such as infrared coupling. But whatever the coupling means, it facilitates connection and disconnection of a separate readout device to the control circuit from the exterior of the housing so that the readout device can contribute to setpoint adjustments without adding weight or bulk to the RC model car when the model car is in operation.

The speed control circuitry 23 may be configured according to known techniques to include the output stage circuitry 24 that is coupled to the DC motor 17. It may also be configured to include a known type of limiter circuitry 25 that functions to limit the current supplied by the output stage circuitry 24 to the DC motor 17, and potentiometer circuitry 33 (e.g., a miniature potentiometer and associated circuitry) may be included to adjust the setpoint of the limiter circuitry 25 (FIG. 2).

Thus, the potentiometer circuitry 33 combines with the limiting circuitry 25 to function as means for adjustably limiting the amount of current supplied to the DC motor 17, the limiting circuitry 25 functioning as means for limiting the amount of current supplied to the DC motor 17 once the amount of current reaches a selected level and the potentiometer circuitry 33 functioning as means for adjusting the selected level. According to another aspect of the invention, the control circuit 12 is configured to increase the amount of voltage supplied to the DC motor 17 at a first rate when the amount of current supplied is less than the selected level and at a second rate that is less than the first rate when the amount of current supplied is greater than the selected level. That is done utilizing known control system design techniques to achieve characteristics such as those illustrated in FIG. 3.

Figure 3:
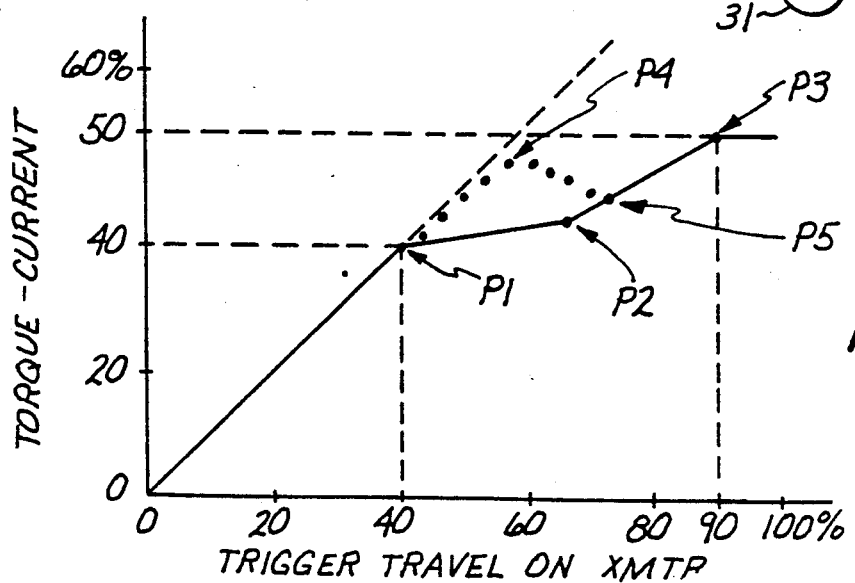
FIG. 3 is a representation of a plot of motor torque (current) versus trigger travel for the RC speed controller.

In FIG. 3, the abscissa indicates trigger position while the ordinate indicates the amount of current supplied. As the operator squeezes the trigger 20b from zero to forty percent of full travel, the current supplied to the DC motor 17 increases at a first rate from zero to some repeated percentage of full value such as the forty percent illustrated in FIG. 3. The point P1 represents the selected setpoint or selected level at which current limiting occurs and it is adjusted in the illustration of FIG. 3 to forty percent (by using the potentiometer circuitry 33). When the current supplied to the DC motor 17 reaches that selected level, the speed control circuitry 23 operates in conjunction with the limiter circuitry 25 and the output stage circuitry 24 to decrease the rate of change of current relative to trigger position from the first rate to a second rate. The control circuit may be configured to vary current at the second rate from 40% to 100% of trigger travel, or, as illustrated, it may vary current at a third rate from point P2 to point P3. Preferably, the rate again changes to zero at the point P3, although it need not. Known control system circuit design techniques may be employed to achieve those characteristics. With the illustrated second and third rates, the current changes only ten percent for a fifty percent change in trigger position.

In addition, the current limiter 25 is configured to allow a brief burst of current if the position of the accelerator trigger changes rapidly in a direction increasing the power supplied. The control circuit delays briefly for that purpose. In other words, when the accelerator trigger 20b is pulled rapidly, the control circuit 12 continues to increase the power beyond the point P1 for a short burst as indicated by the dotted line in FIG. 3. It increases that way to point P4 and then decrease to a point P5, returning in that way to the level that would have occurred if the control circuit 12 had immediately changed to the second rate at point P1.

In use, an operator connects the readout device 31 and adjusts the potentiometer circuitry 33 so that the change in rate occurs at a selected level or selected setpoint. That is done by squeezing the trigger 20b, noting when the change in rate occurs, and then adjusting the potentiometer circuitry 33 until the change in rate occurs at the desired current level. Once that level is reached, motor speed is less sensitive to trigger travel.

Thus, the invention provides an RC speed controller that has a current limiter and a test point to which to connect a meter or other suitable readout device (e.g., a digital voltmeter). The operator determines a reference setpoint for a particular RC model car using existing empirical methods while noting a corresponding reference value indicated by the readout device. Thereafter, the operator simple consults the readout device in order to adjust the speed controller back to the reference setpoint or to some other setpoint that is some desired proportion of the reference setpoint. The readout device simply provides a readily discernible relative indication of setpoint adjustments.

Thus, adjustment of the speed controller is more convenient. It is less time consuming. A particular setpoint can be conveniently repeated. Adjustment uses very little battery power. It can be done rapidly just before the race. The operator can vary the setpoint by a selected proportion of the reference setpoint in order to account for experience gained from a previous race, and the use of a separate, external readout device that can be detached adds no additional weight or size to the miniature speed controller. Moreover, the circuitry employed can be configured to result in a residual but decreased response to trigger travel once a selected current level is reached.

Although an exemplary embodiment has been shown and described, many changes, modifications, and substitutions may be made by one having ordinary skill in the art without necessarily departing from the spirit and scope of the invention. In that regard, reference to the control circuit being mounted in the housing is intended to include such variations as the control circuit being mounted on the housing or encapsulated within the housing. In addition, it is intended that a housing having an opening with a removable plug or other cover in or over the opening would constitute a test point arrangement within the scope of the claims.

What is claimed is:

1. A speed controller, comprising:
   a housing adapted to be mounted in a radio controlled model car having a DC motor, a battery, and a receiver; and
   means defining a control circuit for controlling the amount of voltage supplied to the DC motor according to speed information supplied by the receiver, which control circuit is mounted in the housing and adapted to be electrically connected to the DC motor, the battery, and the receiver;
   wherein the control circuit includes means for producing an output signal related to the amount of current supplied to the motor and means defining a test point arrangement for facilitating coupling of a separate readout device to the control circuit for purposes of reading the output signal.

2. A speed controller as recited in claim 1, wherein the test point arrangement includes an opening in the housing that facilitates connection of the separate readout device to a particular point on the control circuit.

3. A speed controller as recited in claim 2, wherein the opening in the housing is aligned with the particular point on the control circuit.

4. A speed controller as recited in claim 2, wherein the test point arrangement includes an electrically conductive element that extends from the control circuit toward the opening.

5. A speed controller as recited in claim 2, wherein the control circuit includes a circuitboard within the housing and the test point arrangement includes an electrically conductive element on the circuitboard that extends toward the opening in the housing.

6. A speed controller as recited in claim 5, wherein the electrically conductive element extends into the opening.

7. A speed controller as recited in claim 6, wherein the electrically conductive element extends through the opening to the exterior of the housing.

8. A speed controller as recited in claim 1, wherein the control circuit includes means for adjustably limiting the amount of current supplied to the motor.

9. A speed controller as recited in claim 8, wherein:
   the means for adjustably limiting the amount of current supplied to the motor includes means for limiting the amount of current supplied to the motor when the amount of current supplied to the motor reaches a selected level; and
   means for adjusting the selected level.

10. A speed controller as recited in claim 9, wherein the control circuit is configured to increase the amount of current supplied to the motor at a first rate when the amount of current is less than the selected level and at a second rate that is less than the first rate when the amount of current is greater than the selected level.

11. A speed controller as recited in claim 10, wherein:
    the speed information supplied by the receiver is related to the position of a separate speed control;
    the control circuit is configured to vary the amount of voltage supplied to the motor according to variations in the position of the speed control; and
    the control circuit is configured to increase the amount of voltage supplied to the motor at a first rate when the amount of current supplied to the motor is less than the selected level and at a second rate when the amount of current supplied to the motor is greater than the selected level.

12. A speed controller, comprising:
    a housing adapted to be mounted in a radio controlled model car having a DC motor, a battery, and a receiver; and
    means defining a control circuit for controlling the amount of voltage supplied to the DC motor according to speed information supplied by the receiver, which control circuit is mounted in the housing and adapted to be electrically connected to the DC motor, the battery, and the receiver;
    wherein the control circuit includes means for producing an output signal related to the amount of current supplied to the motor and means for coupling the output signal to a separate readout device;
    wherein the means for coupling the output signal to a separate readout device includes a test point arrangement electrically connected to the control circuit; and
    wherein the test point arrangement includes an electrically conductive pin to which an operator can electrically connect the readout device.

13. A speed controller, comprising:
    a housing adapted to be mounted in a radio controlled model car having a DC motor, a battery, and a receiver; and
    means defining a control circuit for controlling the amount of voltage supplied to the DC motor according to speed information supplied by the receiver, which control circuit is mounted on the housing and adapted to be electrically connected to the DC motor, the battery, and the receiver;
    wherein the control circuit includes means for adjustably limiting the amount of current supplied to the motor, the means for adjustably limiting the amount of current supplied to the motor including means for limiting the amount of current supplied to the motor when the amount of current supplied to the motor reaches a selected level and means for adjusting the selected level; and wherein the control circuit is configured to increase the amount of current supplied to the motor at a first rate when the amount of current is less than the selected level and at a second rate that is less than the first rate when the amount of current is greater than the selected level.

14. A speed controller as recited in claim 13, wherein the control circuit includes means for producing an output signal related to the amount of current supplied to the motor and means defining a test point arrangment for coupling the output signal to a separate readout device;

15. A speed controller as recited in claim 13, wherein:
the speed information supplied by the receiver is related to the position of a separate speed control;
the control circuit is configured to vary the amount of power supplied to the motor according to variations in the position of the speed control; and
the control circuit is configured to increase the amount of power supplied to the motor at a first rate when the amount of current supplied to the motor is less than the selected level and at a second rate when the amount of current supplied to the motor is greater than the selected level.

16. A speed controller as recited in claim 13, wherein the control circuit is configured to delay changing to the second rate briefly if the speed control is actuated rapidly, thereby to allow a brief burst of current beyond the selected level.

* * * * *